United States Patent
Birr et al.

(10) Patent No.: US 12,407,579 B2
(45) Date of Patent: Sep. 2, 2025

(54) SYSTEMS AND METHODS FOR UTILIZING MACHINE LEARNING MODELS TO DETERMINE RADIO ACCESS NETWORK ANTENNA PERFORMANCE IMPACT

(71) Applicant: Verizon Patent and Licensing Inc., Basking Ridge, NJ (US)

(72) Inventors: Jason A. Birr, Lithia, FL (US); Deborah Lynn Liske, Durham, NC (US); Richard S. Delk, Irmo, SC (US); Brian A. Ward, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 384 days.

(21) Appl. No.: 18/181,391

(22) Filed: Mar. 9, 2023

(65) Prior Publication Data
US 2024/0305536 A1    Sep. 12, 2024

(51) Int. Cl.
| | |
|---|---|
| H04L 41/16 | (2022.01) |
| H04L 41/0677 | (2022.01) |
| H04W 24/02 | (2009.01) |
| H04W 24/04 | (2009.01) |
| H04W 24/10 | (2009.01) |

(52) U.S. Cl.
CPC .......... *H04L 41/16* (2013.01); *H04L 41/0677* (2013.01); *H04W 24/02* (2013.01); *H04W 24/04* (2013.01); *H04W 24/10* (2013.01)

(58) Field of Classification Search
CPC .... H04L 41/16; H04L 41/0677; H04W 24/10; H04W 24/02; H04W 24/04
See application file for complete search history.

(56) References Cited

U.S. PATENT DOCUMENTS

| | | | |
|---|---|---|---|
| 11,539,597 B1 * | 12/2022 | Crespo | H04L 41/142 |
| 2019/0052381 A1 * | 2/2019 | Abdelmonem | H04L 27/2647 |
| 2021/0160719 A1 * | 5/2021 | Winter | G06N 3/045 |
| 2021/0337401 A1 * | 10/2021 | Birr | H04W 24/02 |
| 2022/0166682 A1 * | 5/2022 | Patrick | H04L 41/0654 |
| 2022/0210789 A1 * | 6/2022 | Bellamkonda | H04W 88/06 |
| 2023/0275675 A1 * | 8/2023 | Coyle | H04W 24/02 455/423 |
| 2023/0299858 A1 * | 9/2023 | Coyle | H04W 24/04 370/252 |
| 2024/0089757 A1 * | 3/2024 | Coyle | G06N 20/10 |

FOREIGN PATENT DOCUMENTS

WO    WO-2023247928 A1 * 12/2023 ........... H04W 16/18

* cited by examiner

*Primary Examiner* — Tonia L Dollinger

(57) ABSTRACT

A device may receive uplink physical resource block (PRB) interference data from a base station, and may process the uplink PRB interference data, with a first machine learning model, to generate same sector similarity score data for the base station. The device may process the same sector similarity score data, with a second machine learning model, to identify and classify at least one antenna issue of the base station, and may create sector-carrier pair data, from the same sector similarity score data, based on the at least one antenna issue. The device may process the sector-carrier pair data, with a third machine learning model, to identify issues that span sector carriers of the base station, and may calculate an issue status and alignment score based on the issues and the same sector similarity score data. The device may perform actions based on the issue status and alignment score.

20 Claims, 19 Drawing Sheets

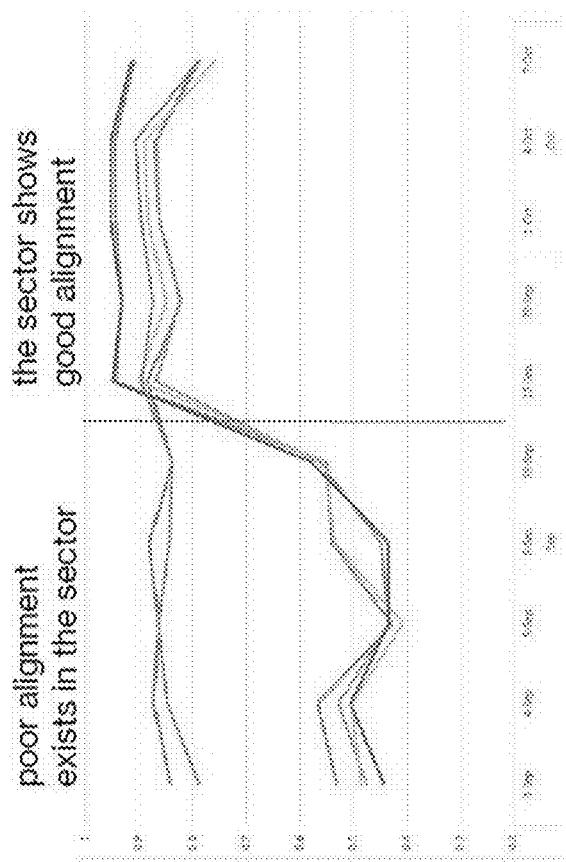
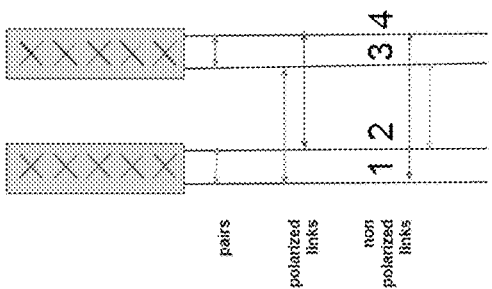
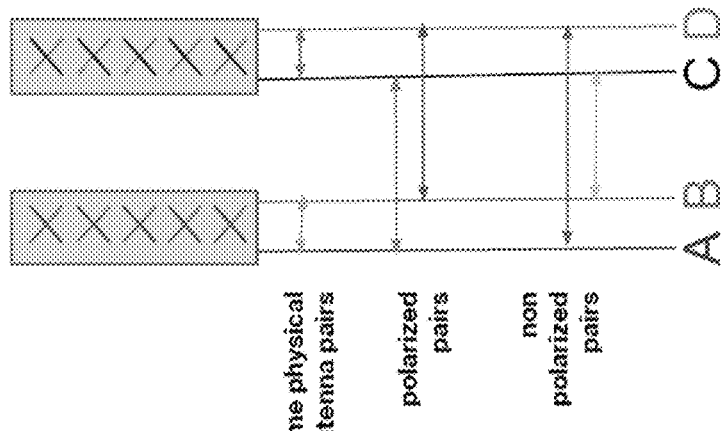
FIG. 1D

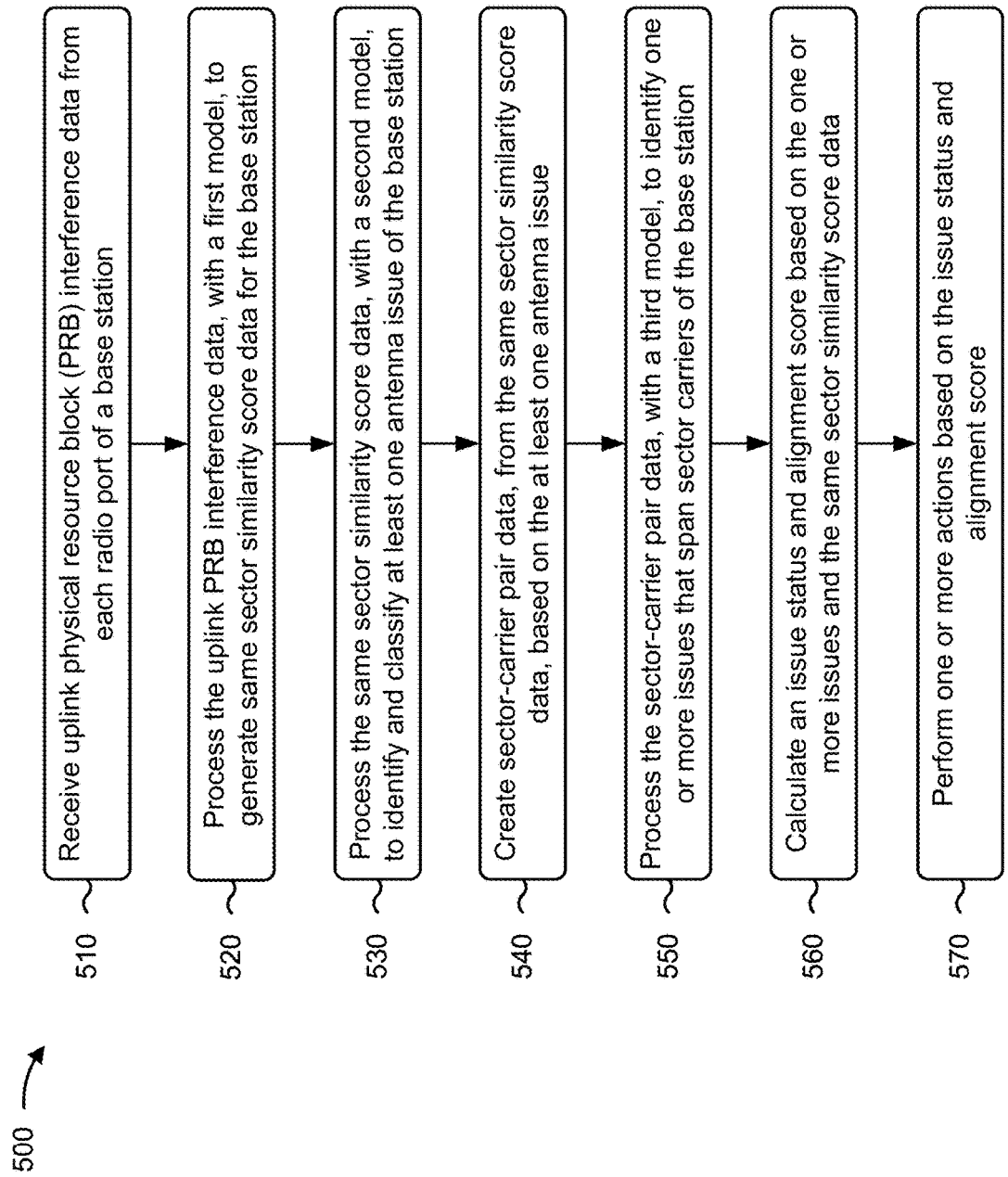

SYSTEMS AND METHODS FOR UTILIZING MACHINE LEARNING MODELS TO DETERMINE RADIO ACCESS NETWORK ANTENNA PERFORMANCE IMPACT

BACKGROUND

A base station may include one or more antennas that transmit and receive radio waves for a radio access network (RAN).

BRIEF DESCRIPTION OF THE DRAWINGS

FIG. 5 is a flowchart of an example process for utilizing machine learning models to determine RAN antenna performance impact.

DETAILED DESCRIPTION OF EXAMPLE EMBODIMENTS

Figure 1A:
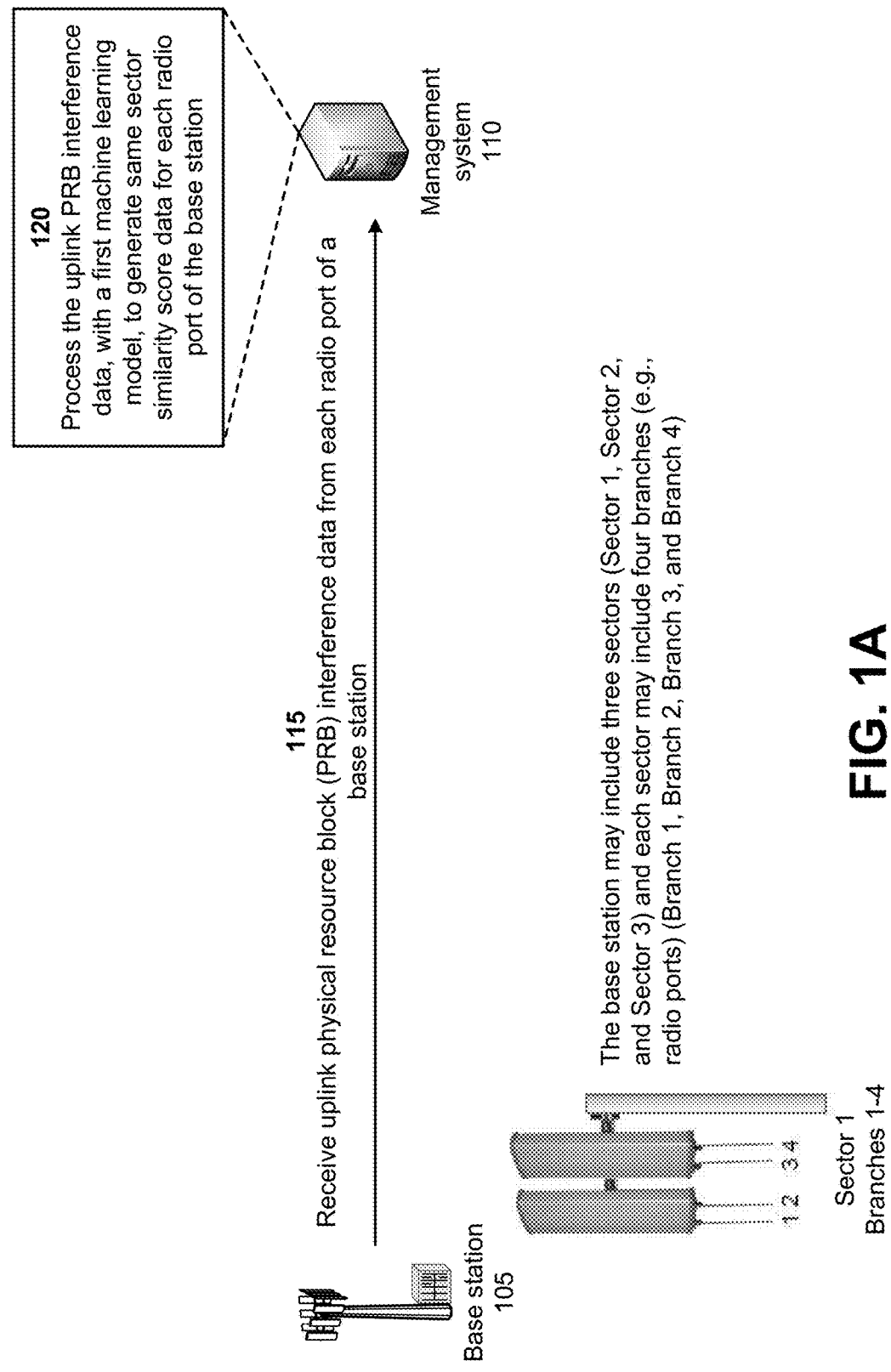
FIGS. 1A-1O are diagrams of an example associated with utilizing machine learning models to determine RAN antenna performance impact.

The following detailed description of example implementations refers to the accompanying drawings. The same reference numbers in different drawings may identify the same or similar elements.

Current systems for monitoring health of antennas of base stations generate excessive false positive antenna alerts daily, since the current systems use a simple static threshold on a quantity (e.g., five, six, seven, and/or the like) of key performance indicators (KPIs) (e.g., antenna alerts) to approximate customer impact (e.g., impact on user equipment (UEs)). The excessive quantity of false positive antenna alerts obscures actual problems with the antennas of the base stations. Such false positive antenna alerts are not truly associated with severe problems, and technicians waste time and resources investigating the false positive antenna alerts. Thus, current systems for monitoring health of antennas of base stations consume computing resources (e.g., processing resources, memory resources, communication resources, and/or the like), networking resources, and/or other resources associated with dispatching technicians to unsuccessfully investigate false positive antenna alerts, providing poor customer experience since actual antenna issues are not timely addressed by technicians, handling lost data caused by the actual antenna issues, and/or the like.

Some implementations described herein provide a management system that utilizes machine learning models to determine RAN antenna performance impact. For example, the management system may receive uplink physical resource block (PRB) interference data from each radio port of a base station, and may process the uplink PRB interference data, with a first machine learning model, to generate same sector similarity score data for each radio port of the base station. The management system may process the same sector similarity score data, with a second machine learning model and at predefined intervals, to identify and classify at least one antenna issue associated with the base station, and may create sector-carrier pair data, from the same sector similarity score data and for a third machine learning model, based on the at least one antenna issue. The management system may process the sector-carrier pair data, with the third machine learning model, to identify one or more issues that span sector carriers of the base station, and may calculate an issue status and alignment score based on the one or more issues that span the sector carriers of the base station and based on the same sector similarity score data. The management system may generate a visualization for sector carriers at a branch level based on the one or more issues that span the sector carriers of the base station, and may perform one or more actions based on the issue status and alignment score and/or the visualization.

In this way, the management system utilizes multiple machine learning models to determine RAN antenna performance impact. For example, the management system may identify issues with antenna alignment, line swaps, bad lines, and other antenna issues caused by severe weather conditions, remote electrical tilt (RET) issues, misconfigurations, and other problems that may result in poor coverage and throughput. The management system may process PRB interference data at a branch level with machine learning models to identify and classify these issues based on ranking antenna-pair correlations across and within a single sector at a base station per carrier. After antenna-pair correlations have been generated for a single sector-carrier at a base station, the management system may utilize a machine learning model to predict whether there is a problem. If there is a problem, the management system may analyze across sectors within the base station to further detail the problem, and may provide a diagnostic response for the problem. Thus, the management system may conserve computing resources, networking resources, and/or other resources that would have otherwise been consumed by dispatching technicians to unsuccessfully investigate false positive antenna alerts, providing poor customer experience since actual antenna issues are not timely addressed by technicians, handling lost data caused by the actual antenna issues, and/or the like.

FIGS. 1A-1O are diagrams of an example 100 associated with utilizing machine learning models to determine RAN antenna performance impact. As shown in FIGS. 1A-1O, example 100 includes a base station 105 associated with a management system 110. Further details of the base station 105 and the management system 110 are provided elsewhere herein. Although implementations are described in connection with a cloud-based management system 110, the implementations described herein may be performed by the base station 105, a server device, a multi-access edge computing (MEC) device, and/or the like.

As shown in FIG. 1A, the base station 105 may include three sectors (e.g., Sector 1, Sector 2, and Sector 3) of antennas and each sector may include four branches (e.g., radio ports) (e.g., Branch 1, Branch 2, Branch 3, and Branch 4). As further shown in FIG. 1A, and by reference number 115, the management system 110 may receive uplink PRB interference data from each radio port of the base station 105. For example, the base station 105 may include one or more antennas that transmit and receive radio waves for a RAN. Signaling may be provided between the antennas of the base station 105 and UEs of the RAN (e.g., over a period of time). The base station 105 may generate the uplink PRB interference data based on the signaling, and may provide the uplink PRB interference data from each radio port to the management system 110. The management system 110 may periodically (e.g., in minutes, hours, and/or the like) receive the uplink PRB interference data from the base station 105, may continuously receive the uplink PRB interference data from the base station 105, may receive the uplink PRB interference data based on providing a request for the uplink PRB interference data to the base station 105, and/or the like.

In some implementations, the uplink PRB interference data may provide a measure of uplink interference power taken per PRB for each line/branch on a sector of the base station. The uplink PRB interference data may include tabular data but may be represented as an image for explanation purposes. The uplink PRB interference data, at a point in time across a frequency range, may represent an interference footprint of a particular antenna of the base station 105.

As further shown in FIG. 1A, and by reference number 120, the management system 110 may process the uplink PRB interference data, with a first machine learning model, to generate same sector similarity score data for each radio port of the base station 105. For example, the management system 110 may be associated with a first machine learning model that includes a classification machine learning model (e.g., a random forest machine learning model). The management system 110 may process the uplink PRB interference data, with the first machine learning model, to generate the same sector similarity score data for each radio port of the base station 105. In some implementations, the same sector similarity score data may provide a measure of similarity for each radio port of the base station 105. For example, for a three-sector base station (BS) 105 with four branches (e.g., radio ports) per sector, the same sector similarity score data may include data such as the data in Table 1:

direction, a correlation between those antennas should be high, relative to antennas of the base station 105 that are not facing in the same direction. As further shown in FIG. 1C, cor1 thru cor6 may represent correlations of the interference footprint between each pair of branches on the same sector of the base station 105. The correlation values may range from zero through one and may be calculated by a similarity metric, where zero may indicate no similarity and one may indicate perfect similarity (e.g., the antennas are perfectly aligned).

FIG. 1D is a diagram depicting antenna pairs of a sector of the base station 105 and an alignment status of the antenna pairs. The term "element" may refer to an antenna of the base station 105, while the terms "link," "branch," or "line" may refer to a connection provided to the base station 105. "Correlation" may refer to a correlation of the interference footprints of two different antennas of the base station 105 (e.g., how similar is an interference pattern between two different antennas/branches). As shown on the left side of FIG. 1D, antennas A and C may be facing in the same direction and may have the same orientation (e.g., a polarized pair of antennas). Therefore, antennas A and C may have a greatest correlation in the same sector of the base station 105. The same situation may be true for antennas B and D. Thus, there may be two correlation values that are very high (e.g., indicating that the antennas are well aligned and have no issue). Antennas A and B may be facing in the same direction, but at different orientations (e.g., a same physical antenna pair). Therefore, the correlation values of antennas A and B may not be as great as the correlation values of polarized pair of antennas. The same situation may

TABLE 1

| BS | Carrier | Sector | Date | 1_2 | 1_3 | 1_4 | 2_3 | 2_4 | 3_4 |
|---|---|---|---|---|---|---|---|---|---|
| 161004 | 1 | 1 | Jan. 15, 2023 | 0.76 | 0.85 | 0.81 | 0.76 | 0.82 | 0.81 |
| 161004 | 1 | 2 | Jan. 15, 2023 | 0.83 | 0.82 | 0.89 | 0.83 | 0.83 | 0.84 |
| 161004 | 1 | 3 | Jan. 15, 2023 | 0.83 | 0.78 | 0.84 | 0.85 | 0.80 | 0.77 |

In some implementations, the management system 110 may rank same sector similarity score data such as that shown in Table 1 to generate data such as that shown in Table 2:

be true for antennas C and D. Antennas A and D may be facing in the same direction, but at different orientations (e.g., a non-polarized pair of antennas). Therefore, the

TABLE 2

| BS | Carrier | Sector | Date | r1 | r2 | r3 | r4 | r5 | r6 |
|---|---|---|---|---|---|---|---|---|---|
| 161004 | 1 | 1 | Jan. 15, 2023 | 0.85 | 0.82 | 0.81 | 0.81 | 0.76 | 0.76 |
| 161004 | 1 | 2 | Jan. 15, 2023 | 0.89 | 0.84 | 0.83 | 0.83 | 0.83 | 0.82 |
| 161004 | 1 | 3 | Jan. 15, 2023 | 0.85 | 0.84 | 0.83 | 0.80 | 0.78 | 0.77 |

Figure 1B:
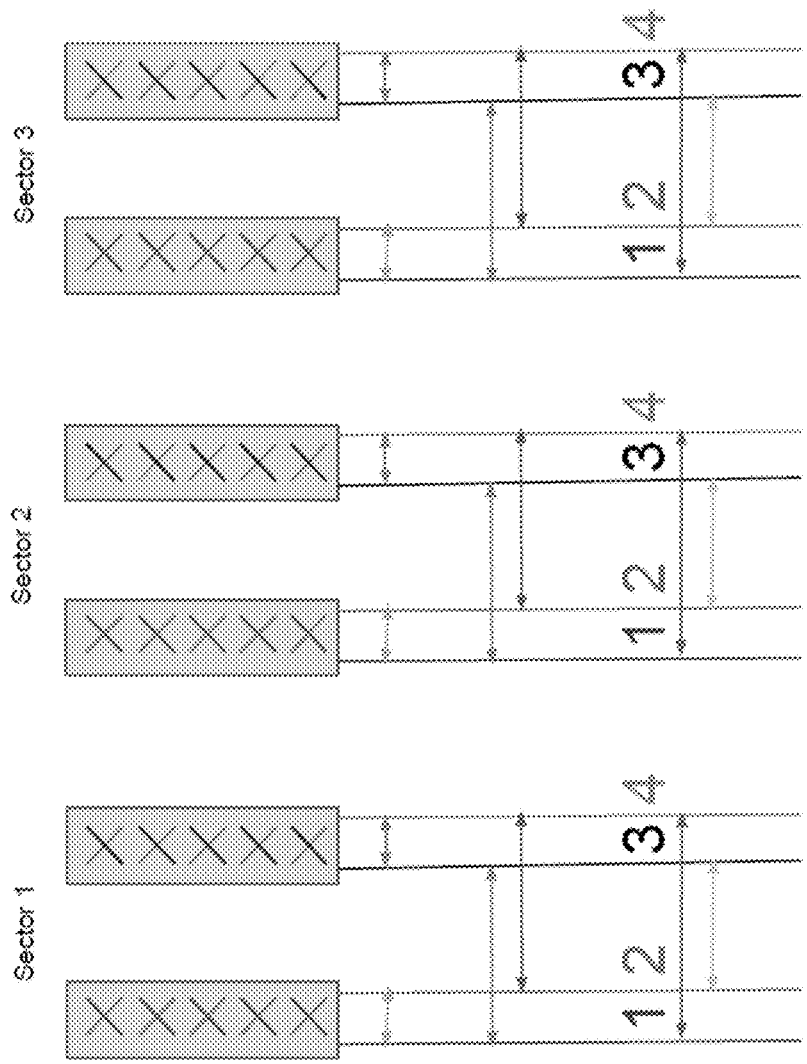

FIG. 1B is a diagram depicting branches and relationships between each pair of branches on a same sector of the base station 105. As shown in FIG. 1B, the base station 105 may include three sectors (e.g., Sector 1, Sector 2, and Sector 3) with two antennas per sector. Numbers 1, 2, 3, and 4 are branch (e.g., element) identifiers per sector. The arrows may signify relationships between each pair of branches. There may be six relationships per sector of the base station 105 for this example configuration.

Figure 1C:
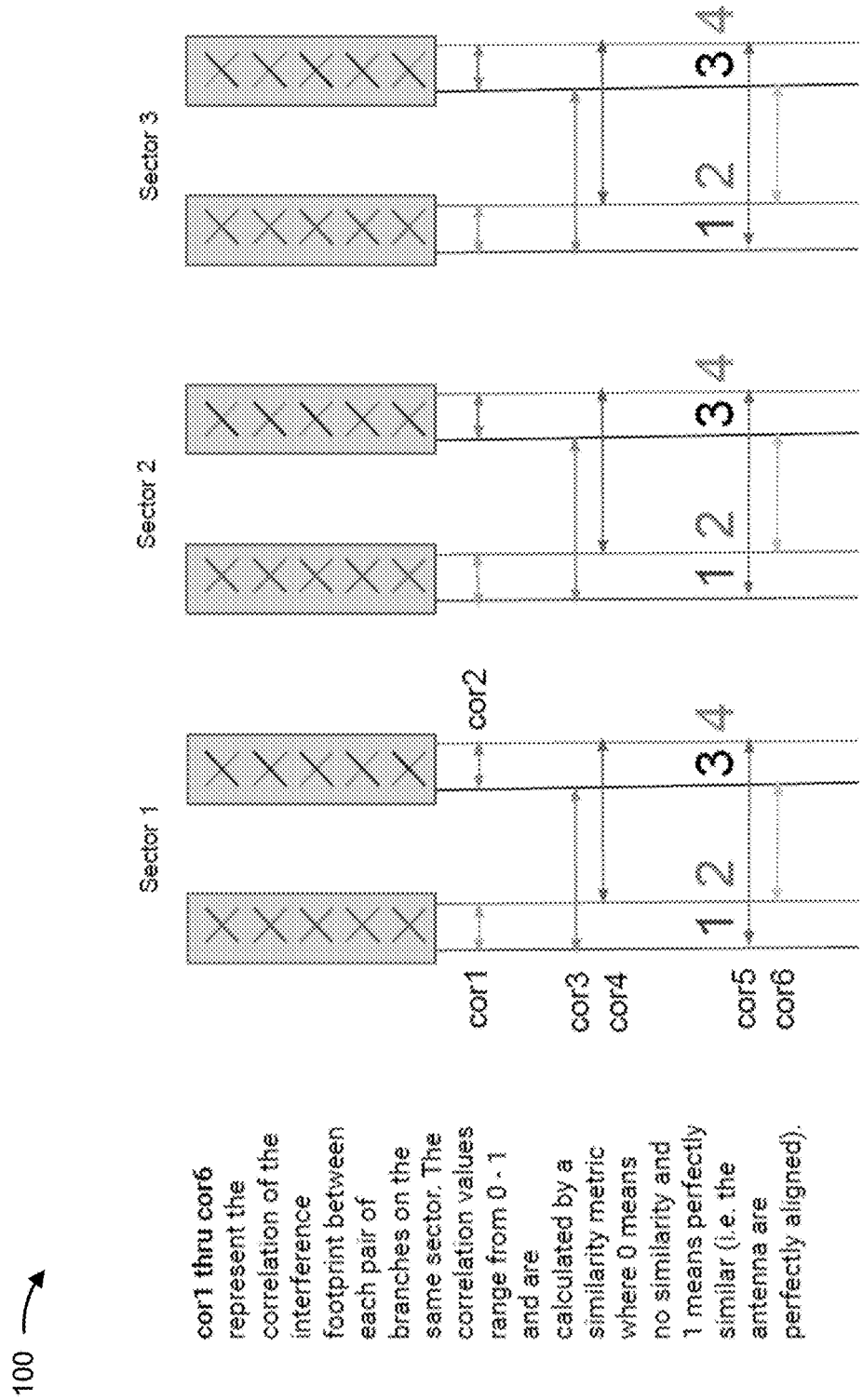

FIG. 1C is a diagram depicting correlations of interference between branches on a same sector of the base station 105. The uplink PRB interference data, at a point in time across a frequency range, may represent an interference footprint of a particular antenna of the base station 105. If the antennas of the base station 105 are pointing in the same correlation values of antennas A and D may not be as great as the polarized pair. The same situation may be true for antennas B and C.

As shown on the right side of FIG. 1D, initially pair 1-2 and pair 3-4 of the base station 105 may be associated with the greatest ranked values since the two antennas associated with pair 1-2 and pair 3-4 are pointing in the same direction but with different orientations. This situation may always be true unless one of the pairs was crossed to a different sector of the base station (e.g., wiring was switched). However, polarized link 1-3, polarized link 2-4, non-polarized link 1-4, and non-polarized link 2-3 may be associated with much lower values (e.g., indicating poor sector alignment). After sector alignment correction, the polarized links 1-3 and 2-4 may be associated with the highest ranked values and the non-polarized links 1-4 and 2-3 may be associated with much improved values.

Figure 1E:
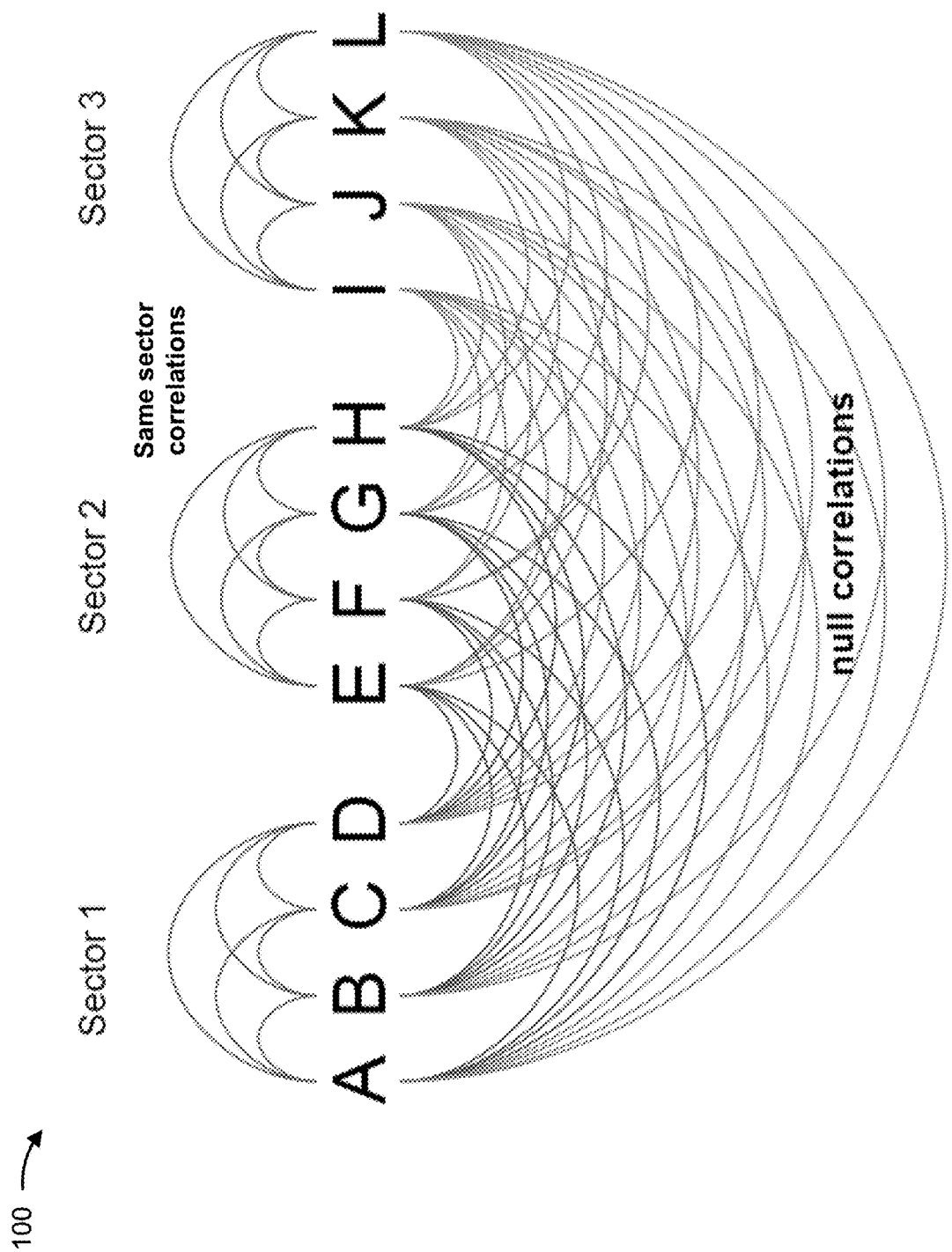

FIG. 1E is a diagram depicting example same sector and null space correlations associated with the sectors of the base station 105. For a three-sector site with four branches per each sector, there may be 18 (3×6) possible same sector correlations and 48 (3×16) possible null space correlations, for a total of 66 possible correlations. As shown, the same sector correlations may include six possible correlations for each of the three sectors (e.g., eighteen possible same sector correlations). The null space correlations may include sixteen possible correlations for each of the three sectors (e.g., forty-eight possible null space correlations).

Figure 1F:
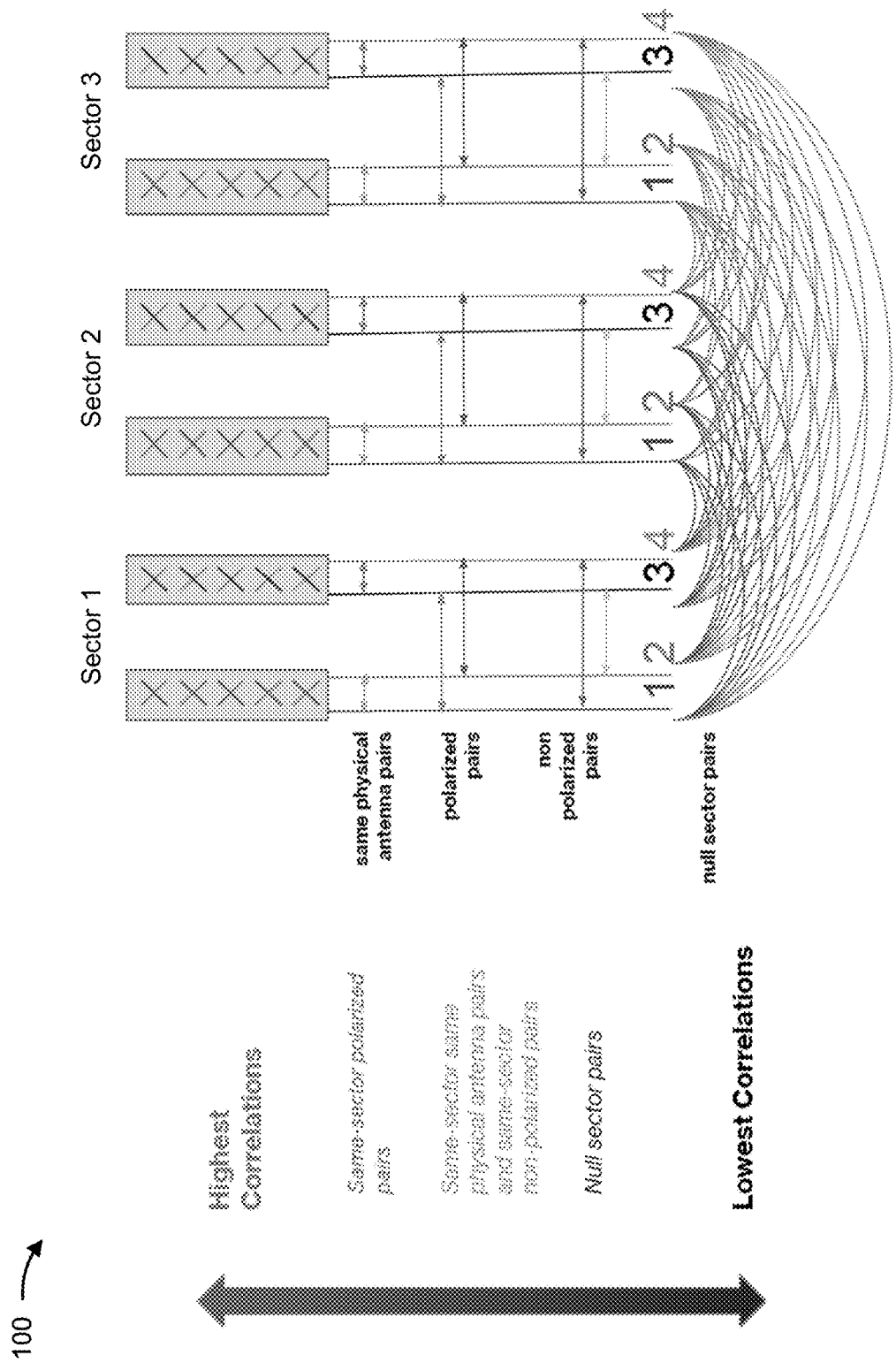

FIG. 1F is a diagram depicting examples of expected correlations associated with the sectors of the base station 105. As shown, the same-sector polarized pairs may include the greatest correlations, followed by the same-sector same physical antenna pairs and the same-sector non-polarized pairs, and then followed by the null sector pairs. The null sector pairs may be associated with a low correlation (e.g., 0.3, 0.5, and/or the like) since there is little overlap relative to each null sector pair. Any positive correlation for the null sector pairs may typically represent noise at the base station 105. In one example, in normal situations, the line for sector 2 may be wired to an element in sector 2. However, if the line is swapped, the line may be wired to an element in another sector. If there is a swapped line between sectors 2 and 3 (e.g., the line is incorrectly connected), then one of the polarized pairs may show a large value.

Figure 1G:
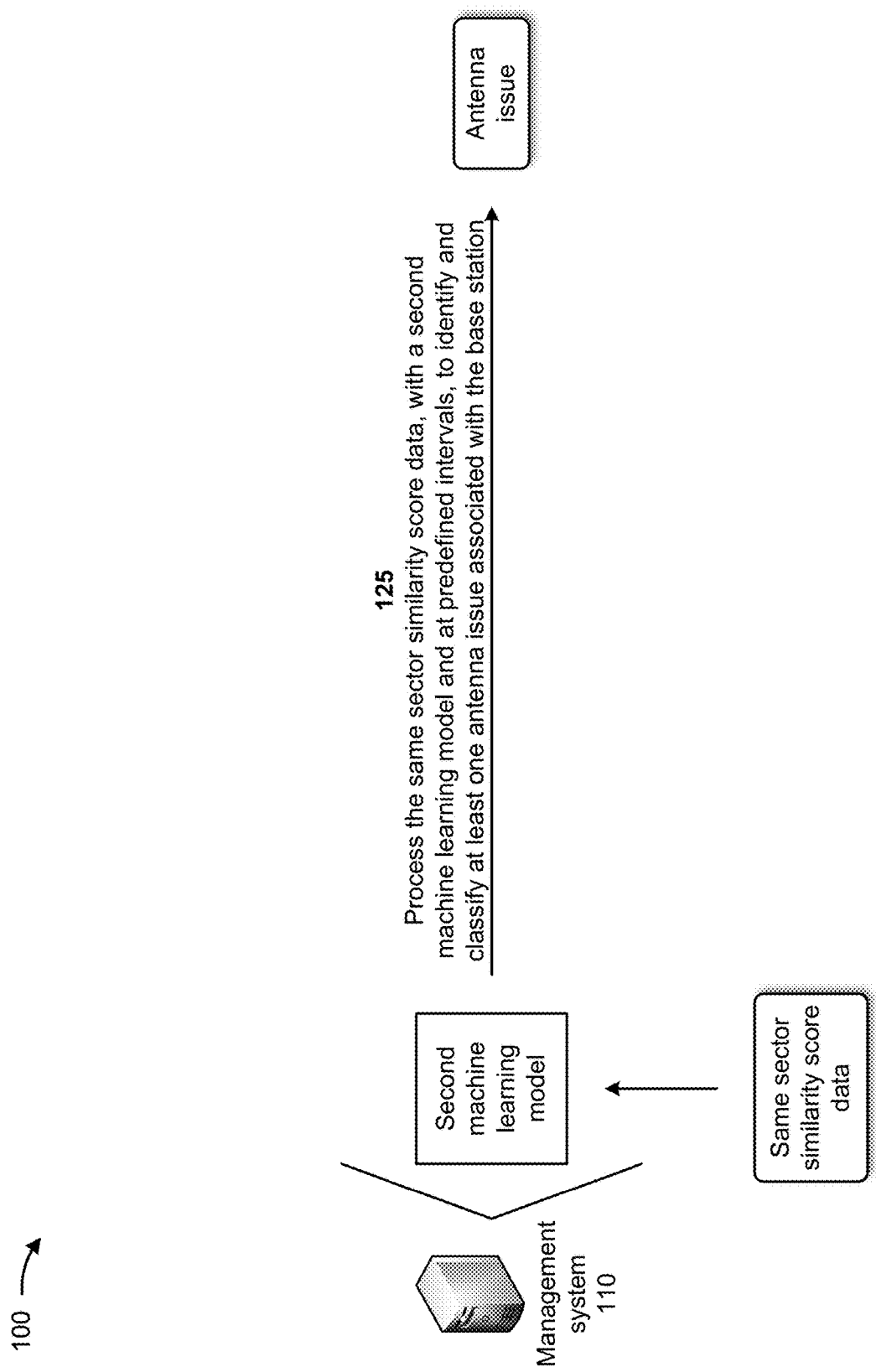

As shown in FIG. 1G, and by reference number 125, the management system 110 may process the same sector similarity score data, with a second machine learning model and at predefined intervals, to identify and classify at least one antenna issue associated with the base station 105. For example, the management system 110 may be associated with a second machine learning model that includes a classification machine learning model (e.g., a random forest machine learning model). In some implementations, after generating the same sector similarity score data for each radio port of the base station 105, the management system 110 may process the same sector similarity score data, with the second machine learning model and at predefined intervals (e.g., in minutes, hours, and/or the like), to identify and classify at least one antenna issue associated with the base station 105. In some implementations, the second machine learning model may not identify any antenna issues associated with the base station 105. In such implementations, the management system 110 may not perform any of the additional processing described below. For example, the management system 110 may only calculate the correlations of the null combinations if an issue is identified in the same sector of the base station 105. In other words, the null space correlations only need to be analyzed if there is an issue identified in the same sector correlations. The null space correlations may be required to identify swaps and may enable the management system 110 to differentiate alignment issues from swap issues and potentially bad lines.

Figure 1H:
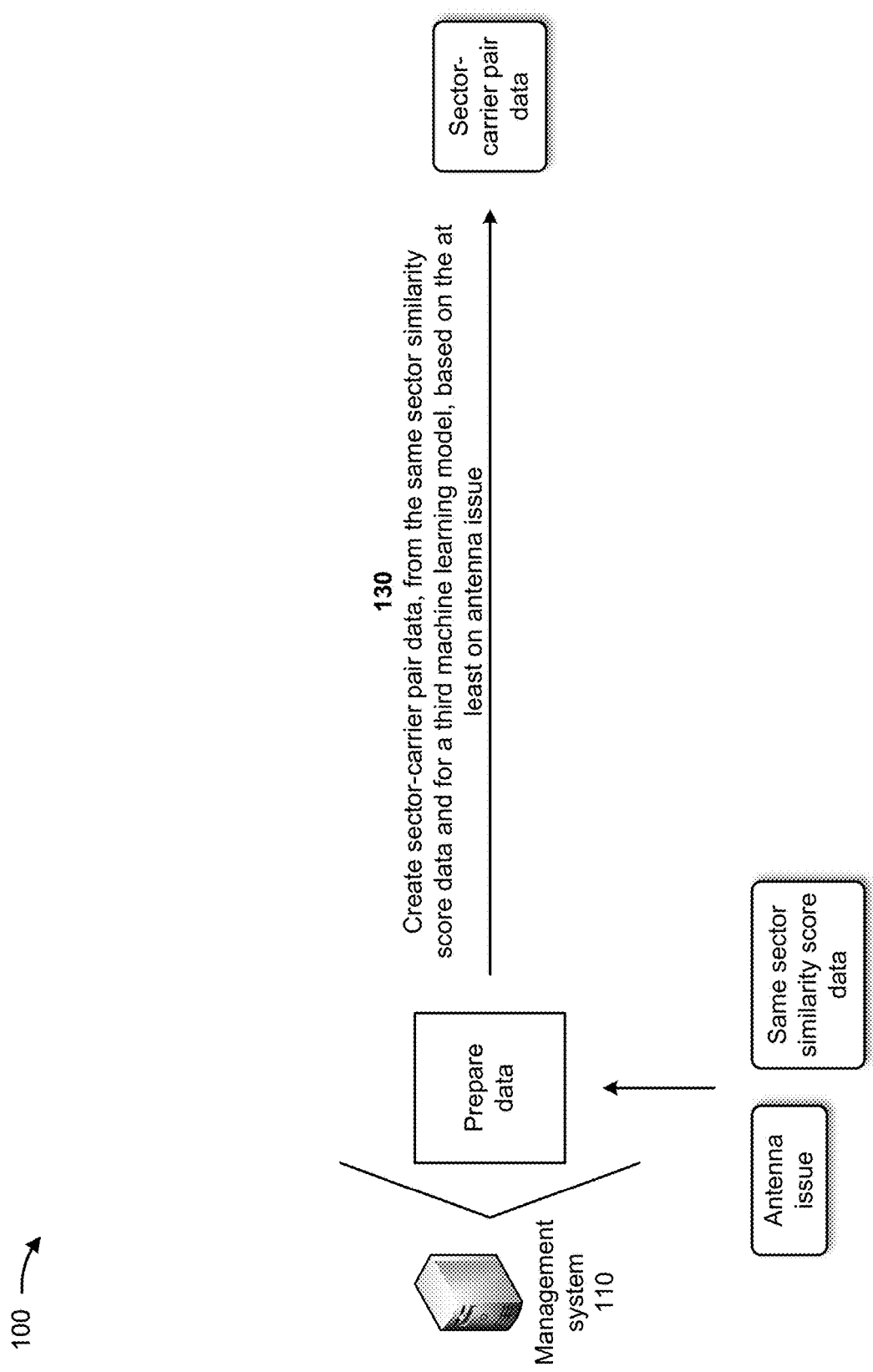

As shown in FIG. 1H, and by reference number 130, the management system 110 may create sector-carrier pair data, from the same sector similarity score data and for a third machine learning model, based on at least one antenna issue. For example, the management system 110 may be associated with a third machine learning model that includes one or more hierarchical classification machine learning models. In some implementations, if the management system 110 identifies at least one antenna issue associated with the base station 105, the management system 110 may create the sector-carrier pair data from the same sector similarity score data and for processing by the third machine learning model. For example, the create sector-carrier pair data may include data such as that shown in the following table:

| BS | Carrier | Sector | Date | r1 ... r6 | Rn1 ... Rn16 |
|---|---|---|---|---|---|
| 161004 | 1 | 1 | Jan. 15, 2023 | 0.85 ... 0.76 | 0.42 ... 0.34 |
| 161004 | 1 | 1 | Jan. 15, 2023 | 0.85 ... 0.76 | 0.44 ... 0.31 |
| 161004 | 1 | 2 | Jan. 15, 2023 | 0.89 ... 0.82 | 0.42 ... 0.34 |
| 161004 | 1 | 2 | Jan. 15, 2023 | 0.89 ... 0.82 | 0.40 ... 0.34 |
| 161004 | 1 | 3 | Jan. 15, 2023 | 0.85 ... 0.77 | 0.44 ... 0.31 |
| 161004 | 1 | 3 | Jan. 15, 2023 | 0.85 ... 0.77 | 0.40 ... 0.31 |

Figure 1I:
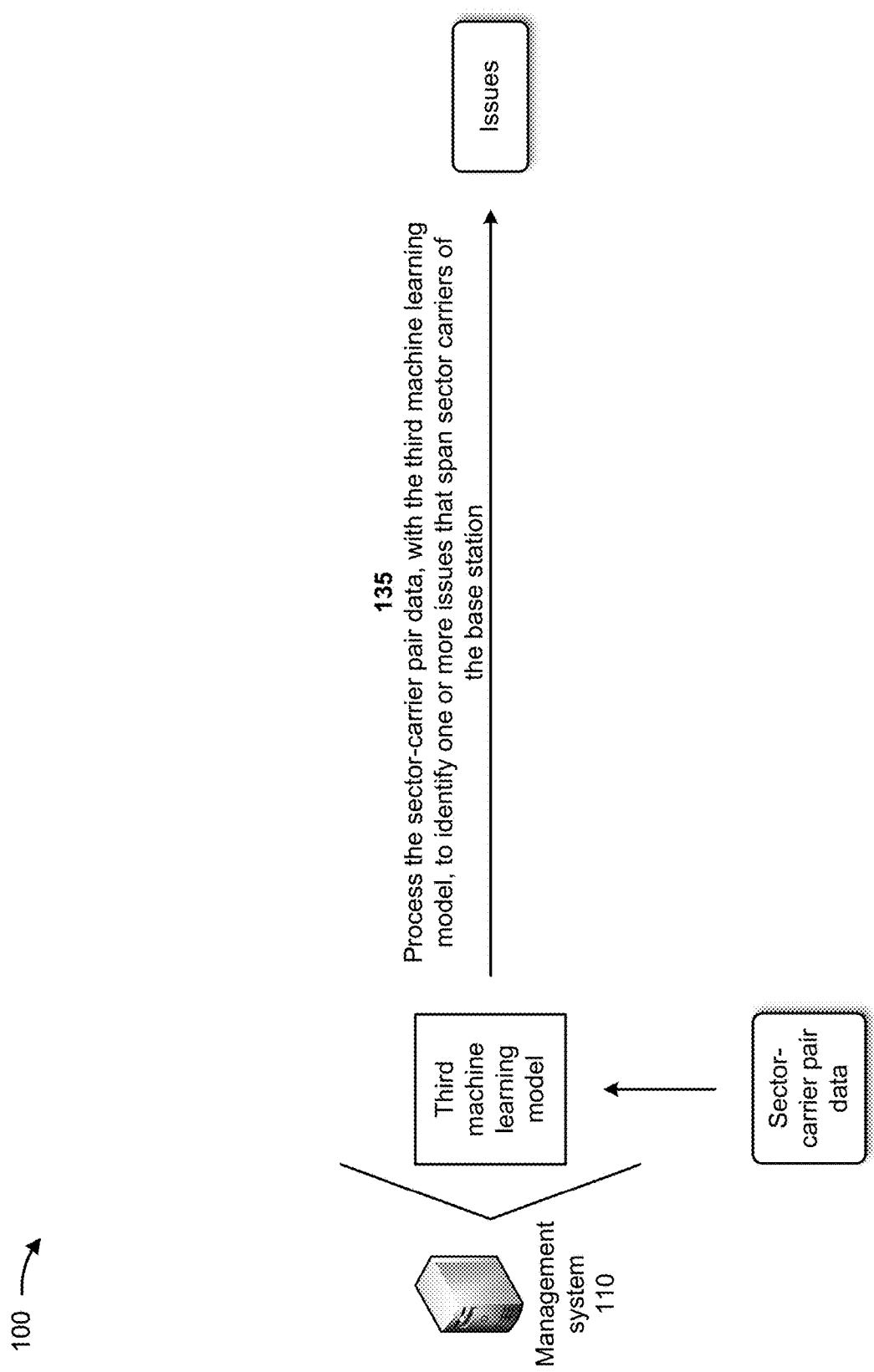

As shown in FIG. 1I, and by reference number 135, the management system 110 may process the sector-carrier pair data, with the third machine learning model, to identify one or more issues that span sector carriers of the base station 105. For example, after creating the sector-carrier pair data from the same sector similarity score data, the management system 110 may process the sector-carrier pair data, with the third machine learning model, to identify the one or more issues that span sector carriers of the base station 105. In some implementations, when processing the sector-carrier pair data, with the third machine learning model, to identify the one or more issues, the management system 110 may combine the ranked same sector correlations of sector 1 with the ranked null correlations between sector 1 and sector 2, and may combine the ranked same sector correlations of sector 1 with the ranked null correlations between sector 1 and sector 3. This may provide two records per sector on a three-sector base station 105. This may enable the management system 110 to capture a signature for each issue type, and then use that signature for inference about each issue.

Figure 1J:
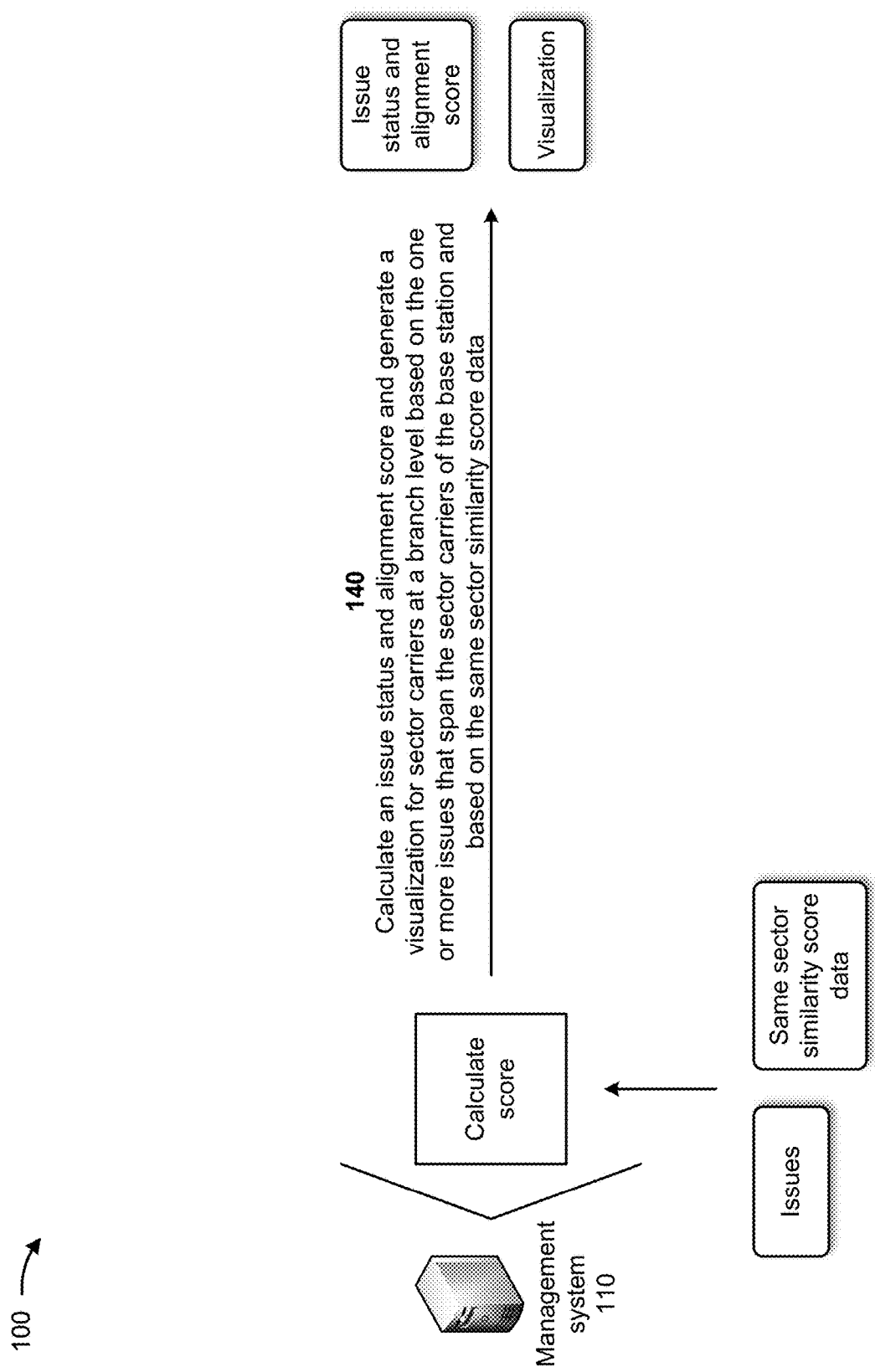

As shown in FIG. 1J, and by reference number 140, the management system 110 may calculate an issue status and alignment score and may generate a visualization for sector carriers at a branch level based on the one or more issues that span the sector carriers of the base station 105 and based on the same sector similarity score data. For example, the management system 110 may calculate the issue status and alignment score for the sector carriers at a branch level based on the one or more issues that span the sector carriers of the base station 105 and based on the same sector similarity score data. In some implementations, when calculating the issue status and alignment score, the management system 110 may calculate null space correlations associated with the base station 105, and may determine, based on the null space correlations, whether the one or more issues are one or more of a bad line associated with the base station, poor antenna alignment associated with the base station, a single line swap associated with the base station, a double line swap associated with the base station, and/or the like.

In some implementations, the management system 110 may generate the visualization for sector carriers at the branch level based on the one or more issues that span the sector carriers of the base station 105 and based on the same sector similarity score data. The visualization may include a circle representing the base station 105 segments on an outer edge of the circle, representing branches of the base station 105, and lines representing correlation values associated with the base station 105. In some implementations, the visualization may indicate one or more bad lines associated with the base station 105, poor antenna alignment associated with the base station 105, a single line swap associated with the base station 105, a double line swap associated with the base station 105, and/or the like. Example visualizations are provided below in connection with FIGS. 1K-1N.

Figure 1K:
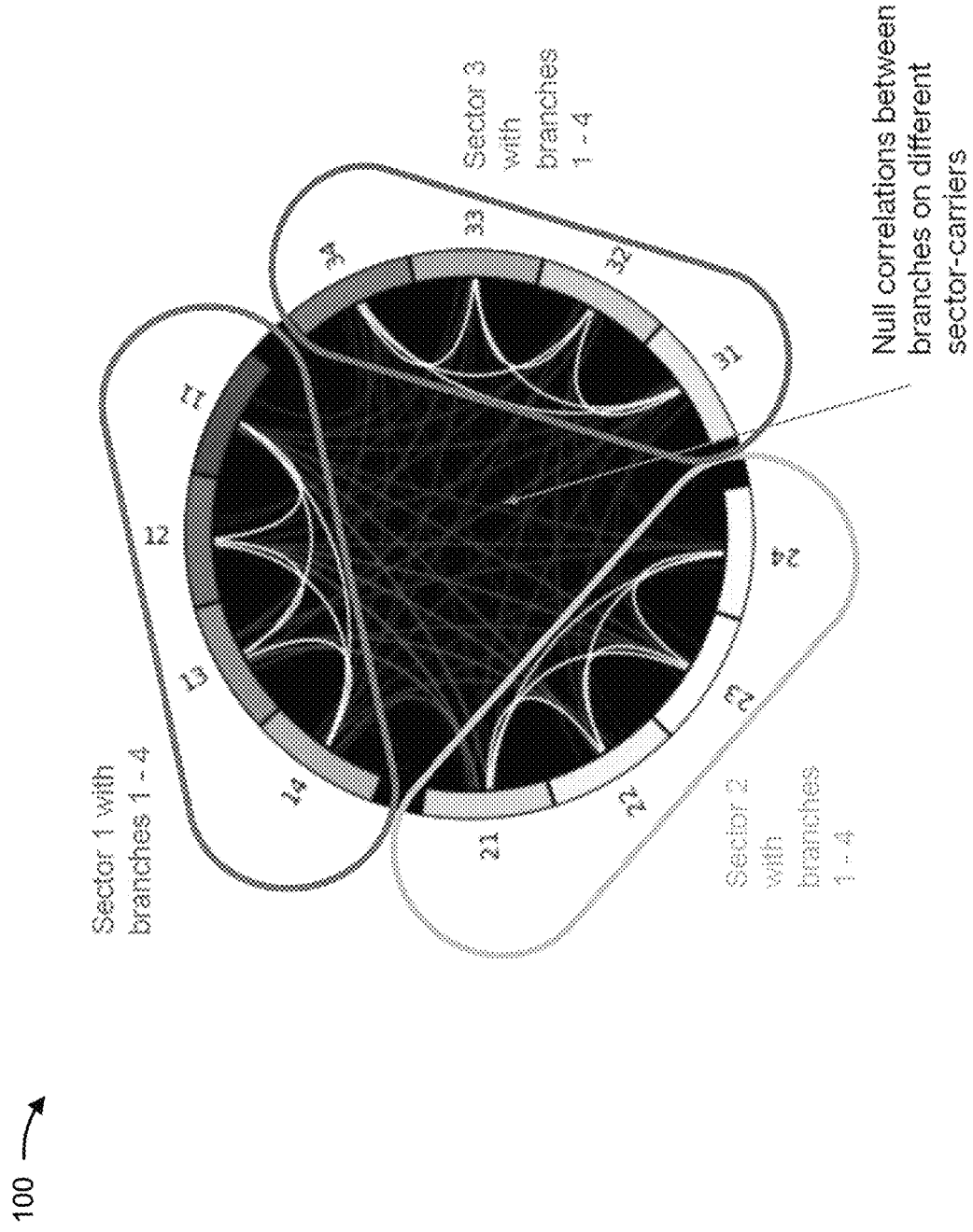

FIG. 1K is a diagram depicting an example visualization that may be generated by the management system 110. As shown, the visualization may include a circle representing the base station 105, segments on an outer edge of the circle representing branches (e.g., branches 11, 12, 13, 14, 21, 22, 23, 24, 31, 32, 33, and 34) of the base station 105, and lines representing correlation values associated with the base station 105. Some of the lines may represent null correlations between the branches on different sector carriers. As further shown, each of the four segments in a sector corresponds to an antenna/branch. Each line may represent a correlation value between connected antenna PRB interference signatures. Brighter lines may indicate greater correlations (e.g., closer to one) and darker lines may indicate lower correlations (e.g., closer to zero). The same-sector correlations may be represented by lines that loop from one antenna to another antenna on the same sector (e.g., these lines should be brighter in a healthy base station 105). The cross-sector (null-space) correlations may be represented by lines that loop from one antenna to another antenna on a different sector (e.g., these lines should be darker in a healthy base station 105).

Figure 1L:
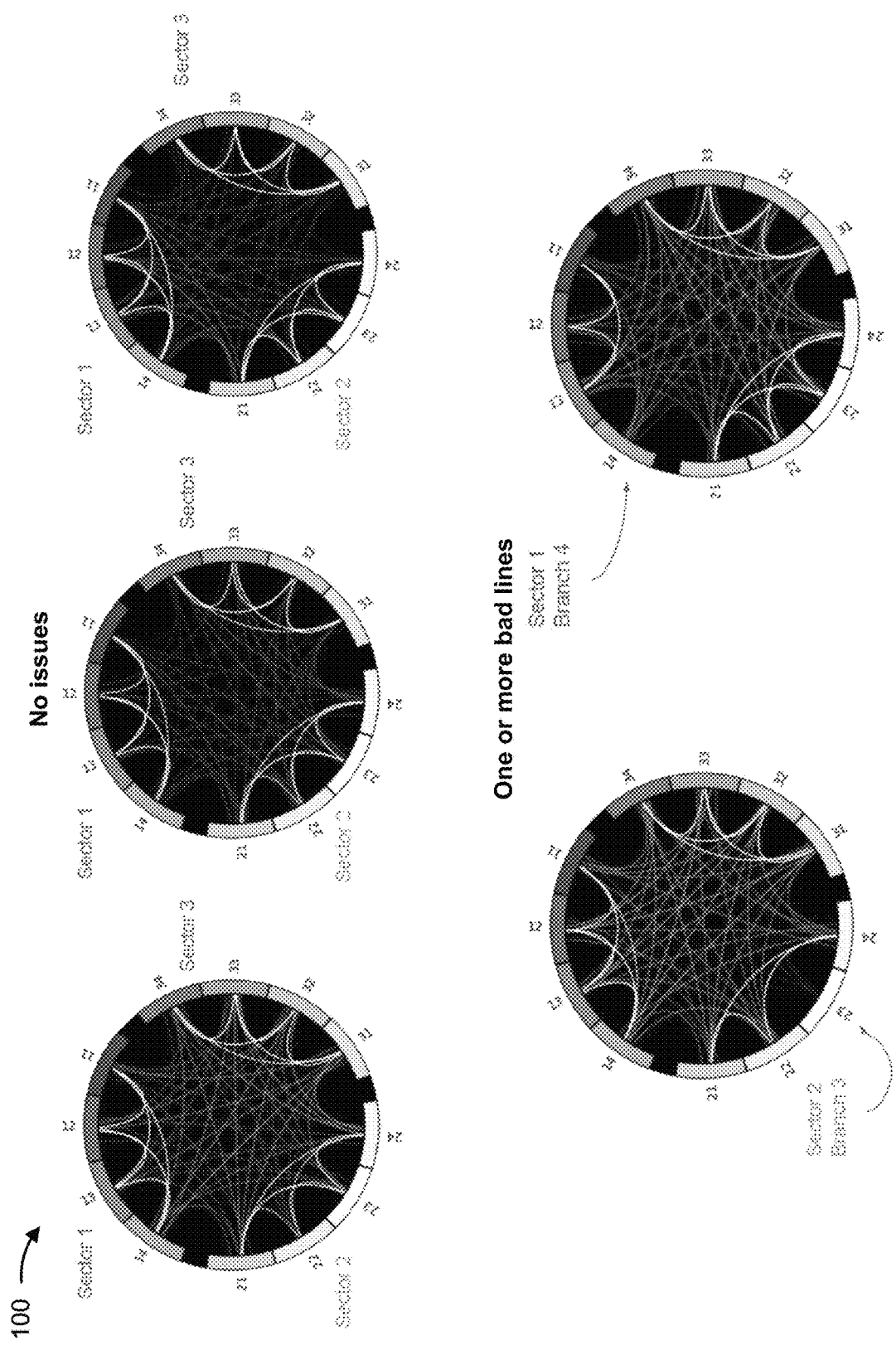

FIG. 1L is a diagram depicting example visualizations that may be generated by the management system 110. The three visualizations shown at the top of FIG. 1L indicate that the base station 105 has no known antenna issues. The two visualizations shown at the bottom of FIG. 1L indicate that the base station 105 includes one or more bad lines. For example, the left visualization indicates that sector 2 and branch 3 are associated with a bad line, and the right visualization indicates that sector 1 and branch 4 are associated with a bad line.

Figure 1M:
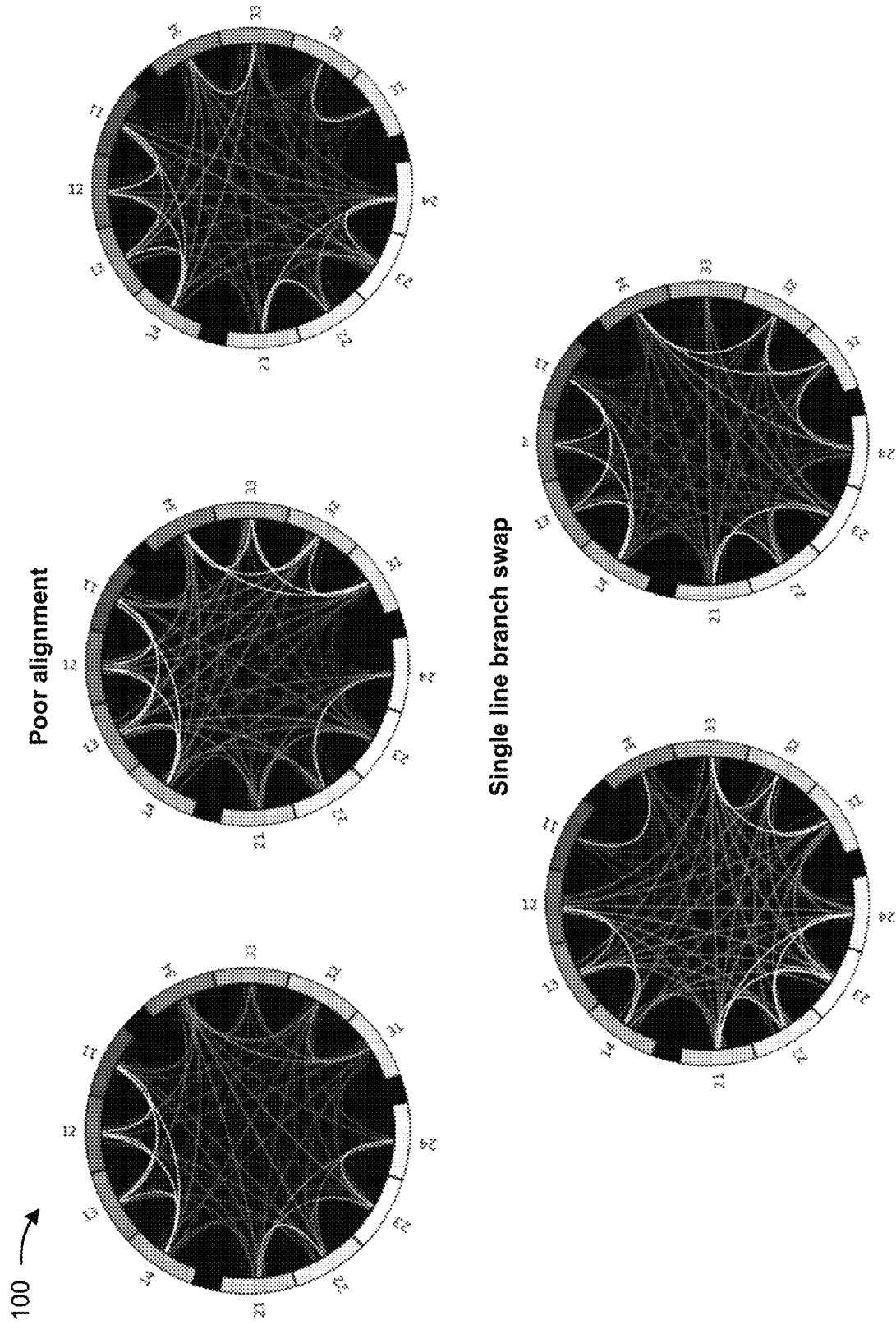

FIG. 1M is a diagram depicting example visualizations that may be generated by the management system 110. The three visualizations shown at the top of FIG. 1M indicate that the base station 105 includes poor antenna alignment. The two visualizations shown at the bottom of FIG. 1M indicate that the base station 105 includes branch swaps (e.g., a single line branch swap).

Figure 1N:
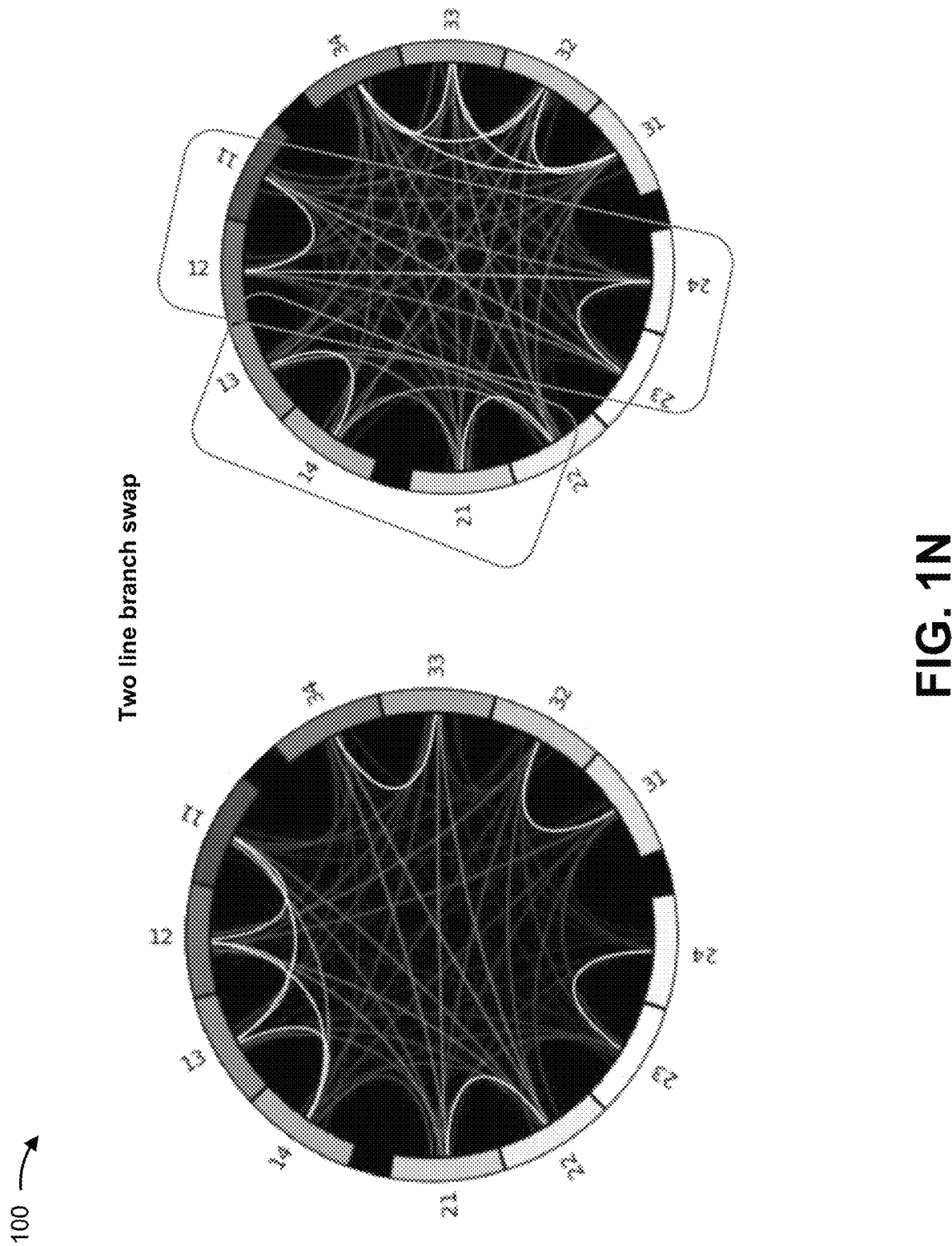
Figure 10:
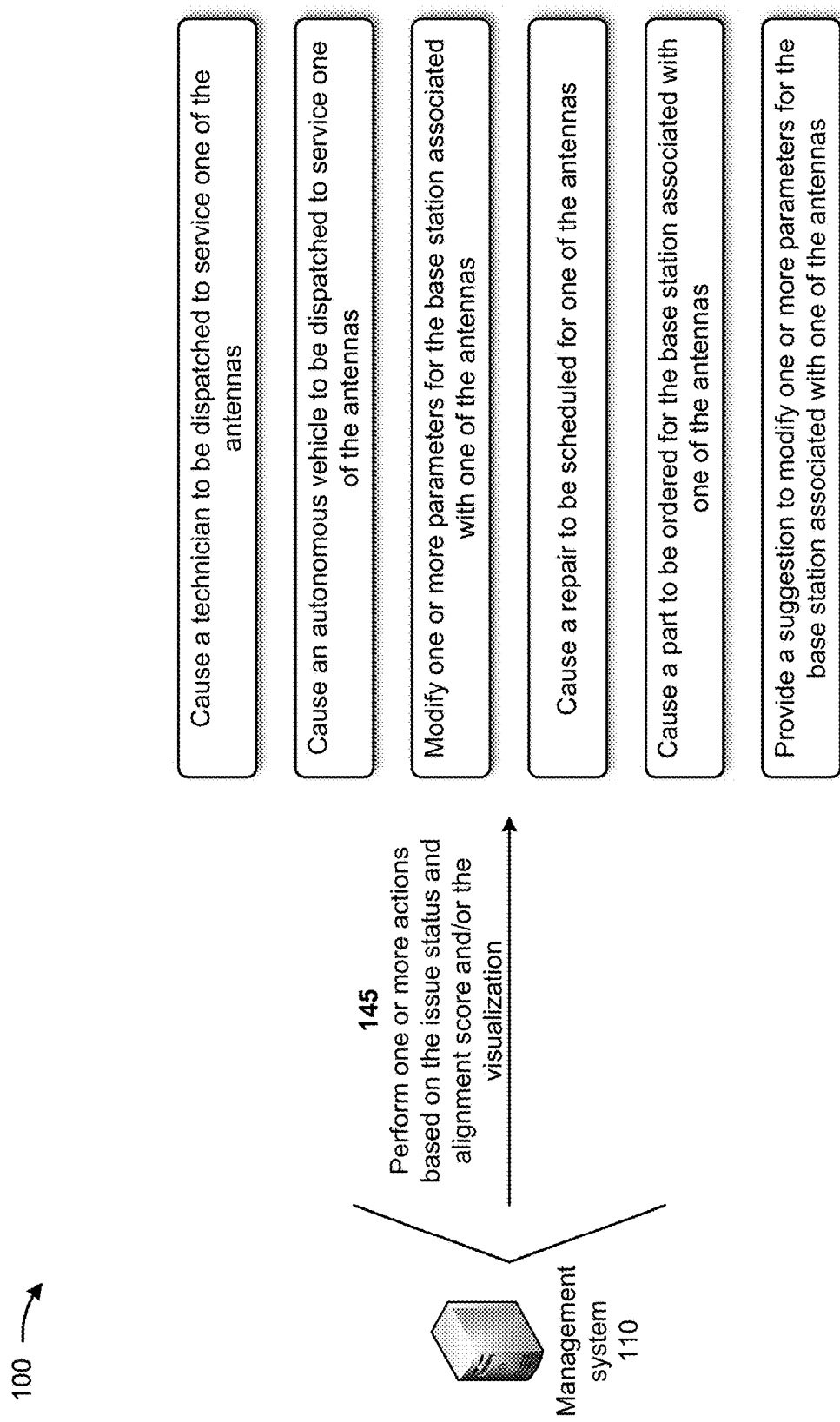

FIG. 1N is a diagram depicting example visualizations capable of being generated by the management system 110. The two visualizations shown in FIG. 1N indicate that the base station 105 includes branch swaps (e.g., a two-line branch swap).

As shown in FIG. 1O, and by reference number 145, the management system 110 may perform one or more actions based on the issue and alignment score and/or the visualization. In some implementations, performing the one or more actions includes the management system 110 causing a technician to be dispatched to service one of the antennas. For example, the management system 110 may provide, to a technician (e.g., a UE of the technician), a notification identifying one of the antennas of the base station 105. The technician may utilize the notification to travel to the antenna and attempt to correct the antenna. In this way, the management system 110 may conserve computing resources, networking resources, and/or other resources that would have otherwise been consumed by dispatching technicians to unsuccessfully investigate false positive antenna alerts.

In some implementations, performing the one or more actions includes the management system 110 causing an autonomous vehicle to be dispatched to service one of the antennas. For example, the management system 110 may provide, to an autonomous vehicle (e.g., a drone, a robot, and/or the like), instructions identifying one of the antennas of the base station 105. The autonomous vehicle may utilize the instructions to travel to the antenna and attempt to correct the antenna. In this way, the management system 110 may conserve computing resources, networking resources, and/or other resources that would have otherwise been consumed by dispatching autonomous vehicles to unsuccessfully investigate false positive antenna alerts.

In some implementations, performing the one or more actions includes the management system 110 modifying one or more parameters for the base station 105 associated with one of the antennas. For example, the management system 110 may identify the base station 105 associated with an antenna experiencing a problem, and may determine parameters of the base station 105 to modify (e.g., adjust an antenna angle, increase antenna power, and/or the like) in order to correct the problem with the antenna. The management system 110 may instruct the base station 105 to modify the parameters in order to correct the problem with the antenna. In this way, the management system 110 may conserve computing resources, networking resources, and/or other resources that would have otherwise been consumed by handling lost data caused by the antenna experiencing the problem or handling false positive antenna alerts.

In some implementations, performing the one or more actions includes the management system 110 causing a repair to be scheduled for one of the antennas of the base station 105. For example, the management system 110 may schedule a technician or an autonomous vehicle to be dispatched to repair an antenna of the base station 105. The management system 110 may review availabilities of technicians or autonomous vehicles when scheduling the technician or the autonomous vehicle for repairing the antenna of the base station 105. In this way, the management system 110 may conserve computing resources, networking resources, and/or other resources that would have otherwise been consumed by handling issues associated with poor customer experience caused by the antenna to be repaired.

In some implementations, performing the one or more actions includes the management system 110 causing a part to be ordered for the base station 105 associated with one of the antennas. For example, the management system 110 may determine that a part of an antenna of the base station 105 needs to be replaced, and may order the part from a supplier of the part. The replacement part, when installed, may cause the antenna to correctly function. In this way, the management system 110 may conserve computing resources, networking resources, and/or other resources that would have otherwise been consumed by providing a poor customer experience while waiting for the new part for the antenna to be available and ready to replace the malfunctioning part.

In some implementations, performing the one or more actions includes the management system 110 providing a suggestion to modify one of the parameters for the base station 105 associated with one of the antennas. For example, the management system 110 may determine that a parameter (e.g., a tilt angle) associated with an antenna of the base station 105 is incorrect, and may determine a modification to the parameter. The management system 110 may provide a suggestion for the modification to a technician responsible for the base station 105. In this way, the management system 110 may conserve computing resources, networking resources, and/or other resources that would have otherwise been consumed by providing a poor customer experience to customers associated with the base station 105 that requires parameter modification.

In this way, the management system 110 utilizes machine learning models to determine RAN antenna performance impact. For example, the management system 110 may identify issues with antenna alignment, line swaps, bad lines, and other antenna issues caused by severe weather conditions, RET issues, misconfigurations and other problems that may result in poor coverage and throughput. The management system 110 may process PRB interference data at a branch level with machine learning models to identify and classify these issues based on ranking antenna-pair correlations across sectors and within a single sector at the base station 105 per carrier. After antenna-pair correlations have been generated for a single-sector carrier at the base station 105, the management system 110 may utilize a machine learning model to predict whether there is a problem. If there is a problem, the management system may analyze across sectors within the base station 105 to further detail the problem, and may provide a diagnostic response for the problem. Thus, the management system 110 may conserve computing resources, networking resources, and/or other resources that would have otherwise been consumed by dispatching technicians to unsuccessfully investigate false positive antenna alerts, providing poor customer experience since actual antenna issues are not timely addressed by technicians, handling lost data caused by the actual antenna issues, and/or the like.

As indicated above, FIGS. 1A-1O are provided as an example. Other examples may differ from what is described with regard to FIGS. 1A-1O. The number and arrangement of devices shown in FIGS. 1A-1O are provided as an example. In practice, there may be additional devices, fewer devices, different devices, or differently arranged devices than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) shown in FIGS. 1A-1O may perform one or more functions described as being performed by another set of devices shown in FIGS. 1A-1O.

Figure 2:
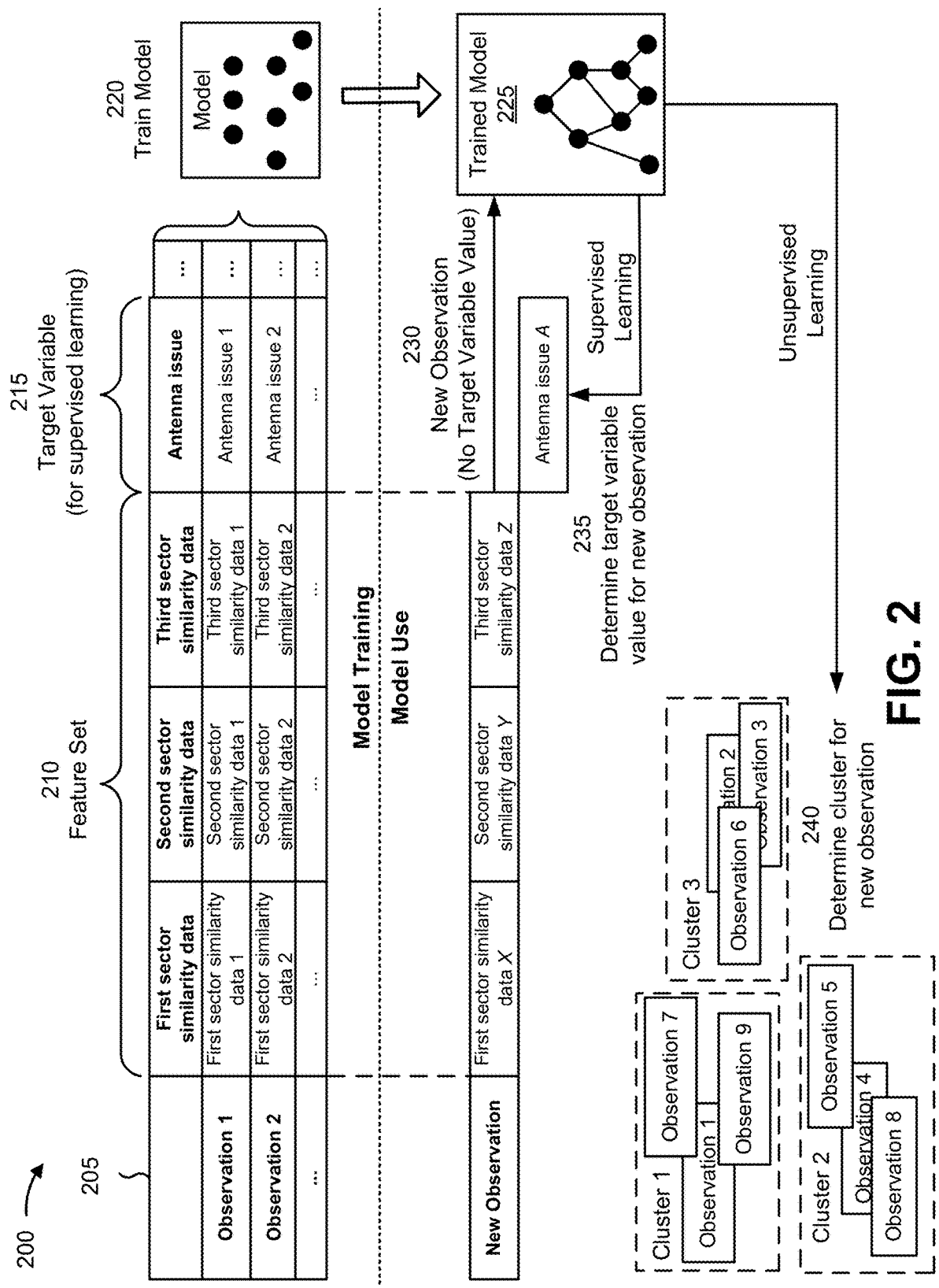
FIG. 2 is a diagram illustrating an example of training and using a machine learning model.

FIG. 2 is a diagram illustrating an example 200 of training and using a machine learning model in connection with systems and methods for utilizing machine learning models to determine RAN antenna performance impact. The machine learning model training and usage described herein may be performed using a machine learning system. The machine learning system may include or may be included in a computing device, a server, a cloud computing environment, or the like, such as the management system 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the management system 110, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the management system 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of first sector similarity data, a second feature of second sector similarity data, a third feature of third sector similarity data, and so on. As shown, for a first observation, the first feature may have a value of first sector similarity data 1, the second feature may have a value of second sector similarity data 1, the third feature may have a value of third sector similarity data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is antenna issue, which has a value of antenna issue 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first sector similarity data X, a second feature of second sector similarity data Y, a third feature of third sector similarity data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of antenna issue A for the target variable of antenna issue for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first sector similarity data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second sector similarity data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine RAN antenna performance impact. The machine learning system may enable recognition and/or identification of tens, hundreds, thousands, or millions of features and/or feature values for tens, hundreds, thousands, or millions of observations, thereby increasing accuracy and consistency and reducing delay associated with determining RAN antenna performance impact relative to requiring computing resources to be allocated for tens, hundreds, or thousands of operators to manually determine RAN antenna performance impact using the features or feature values.

As indicated above, FIG. 2 is provided as an example. Other examples may differ from what is described in connection with FIG. 2.

Figure 3:
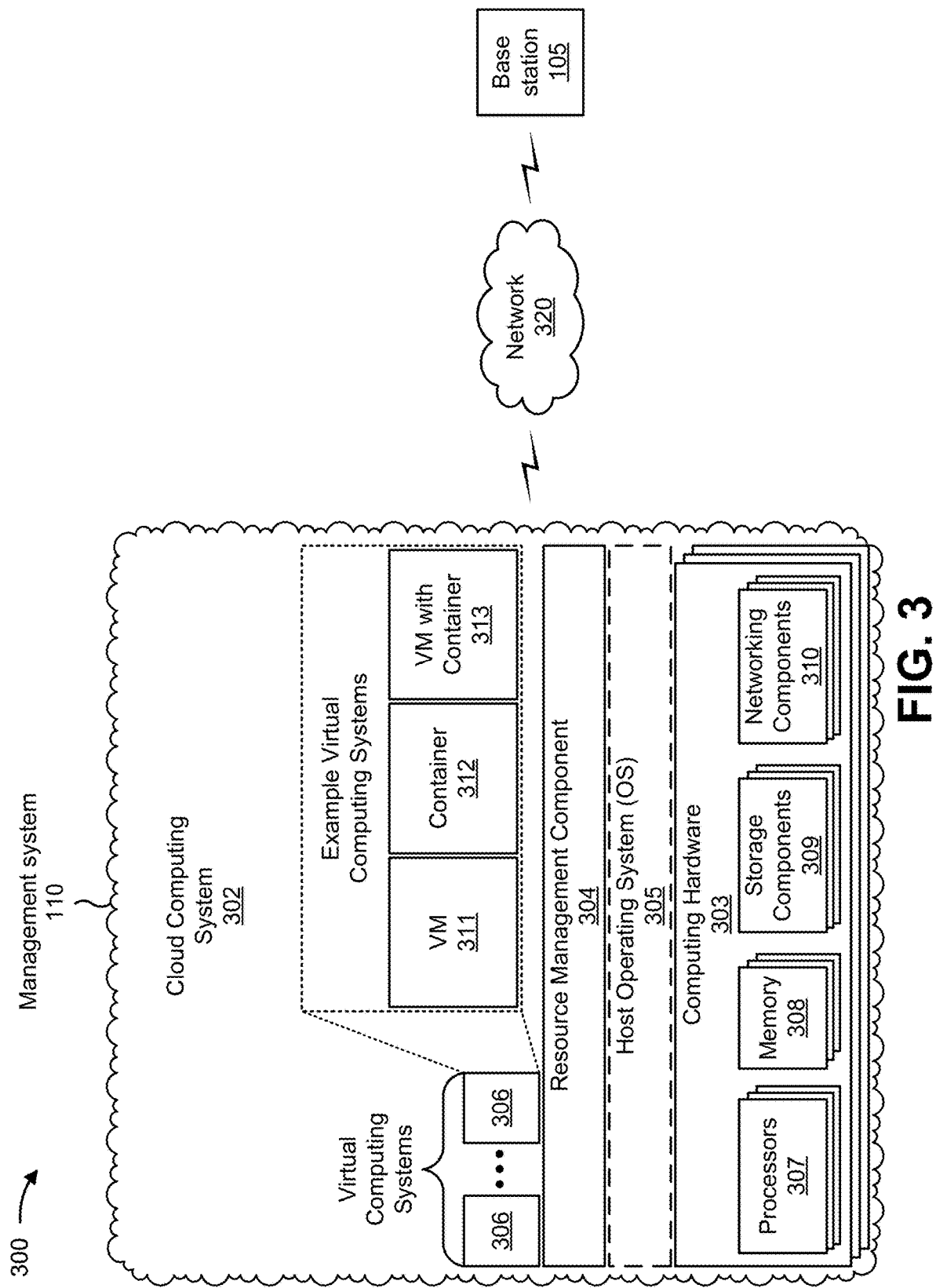
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the management system 110, which may include one or more elements of and/or may execute within a cloud computing system 302. The cloud computing system 302 may include one or more elements 303-313, as described in more detail below. As further shown in FIG. 3, the environment 300 may include the base station 105 and/or a network 320. Devices and/or elements of the environment 300 may interconnect via wired connections and/or wireless connections.

The base station 105 includes one or more devices capable of transferring traffic, such as audio, video, text, and/or other traffic, destined for and/or received from a UE. For example, the base station 105 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 105 may support, for example, a cellular radio access technology (RAT). The base station 105 may transfer traffic between a UE (e.g., using a cellular RAT), one or more other base stations 105 (e.g., using a wireless interface or a backhaul interface, such as a wired backhaul interface), and/or a core network. The base station 105 may provide one or more cells that cover geographic areas.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the management system 110 may include one or more elements 303-313 of the cloud computing system 302, may execute within the cloud computing system 302, and/or may be hosted within the cloud computing system 302, in some implementations, the management system 110 may not be cloud-based (e.g., may be implemented outside of a cloud computing system) or may be partially cloud-based. For example, the management system 110 may include one or more devices that are not part of the cloud computing system 302, such as the device 400 of FIG. 4, which may include a standalone server or another type of computing device. The management system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
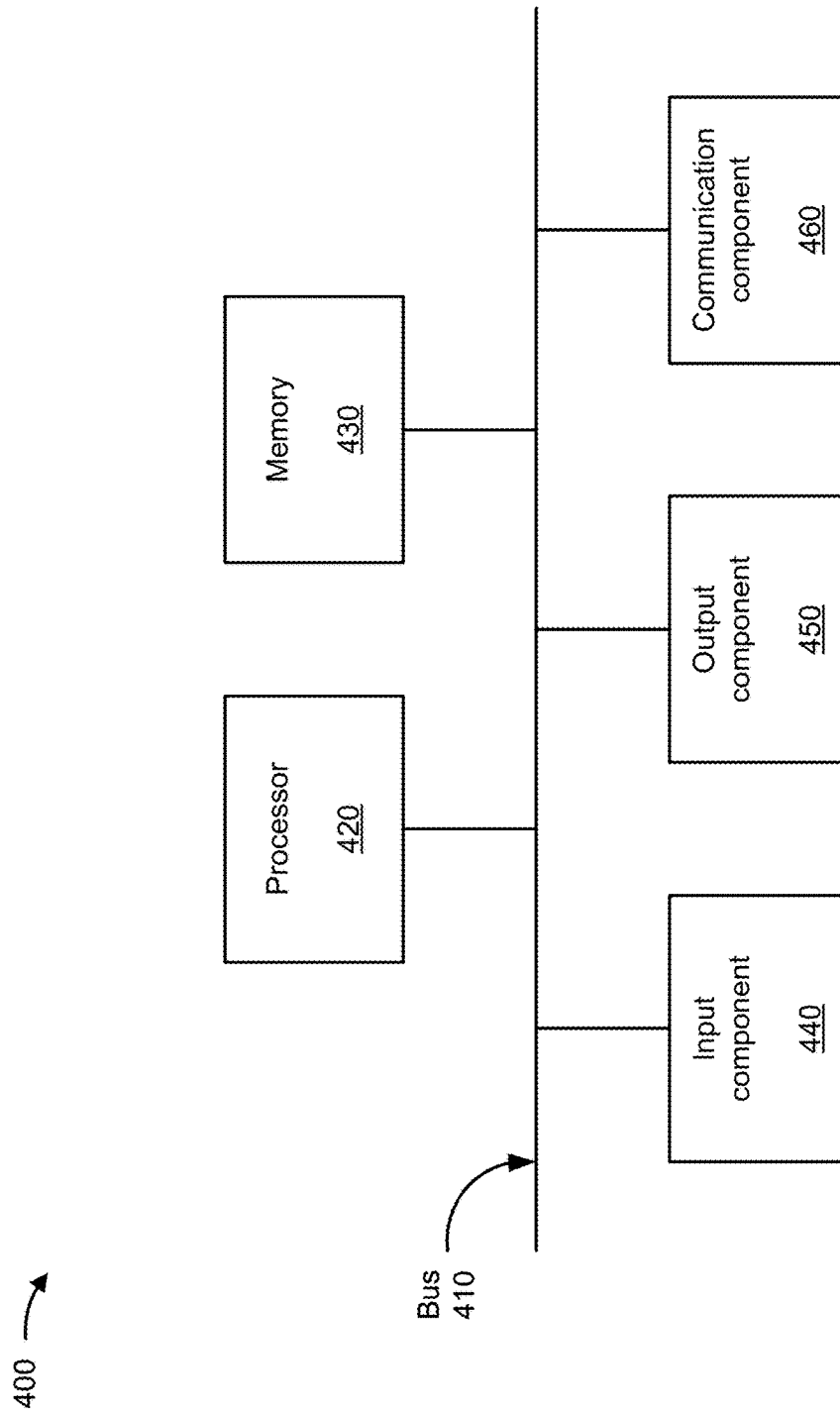
FIG. 4 is a diagram of example components of one or more devices of FIG. 3.

FIG. 4 is a diagram of example components of a device 400, which may correspond to the base station 105 and/or the management system 110. In some implementations, the base station 105 and/or the management system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing machine learning models to determine RAN antenna performance impact. In some implementations, one or more process blocks of FIG. 5 may be performed by a device (e.g., the management system 110). In some implementations, one or more process blocks of FIG. 5 may be performed by another device or a group of devices separate from or including the device, such as a base station (e.g., the base station 105), a server device, a multi-access edge computing (MEC) device, and/or the like. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving uplink PRB interference data from each radio port of a base station (block 510). For example, the device may receive uplink PRB interference data from each radio port of a base station, as described above. In some implementations, the device is one of a cloud-computing device, a server device, the base station, or an MEC device.

As further shown in FIG. 5, process 500 may include processing the uplink PRB interference data, with a first model, to generate same sector similarity score data for the base station (block 520). For example, the device may process the uplink PRB interference data, with a first machine learning model, to generate same sector similarity score data for each radio port of the base station, as described above.

As further shown in FIG. 5, process 500 may include processing the same sector similarity score data, with a second model, to identify and classify at least one antenna issue of the base station (block 530). For example, the device may process the same sector similarity score data, with a second machine learning model and at predefined intervals, to identify and classify at least one antenna issue associated with the base station, as described above. In some implementations, each of the first machine learning model and the second machine learning model is a classification machine learning model.

As further shown in FIG. 5, process 500 may include creating sector-carrier pair data, from the same sector similarity score data, based on the at least one antenna issue (block 540). For example, the device may create sector-carrier pair data, from the same sector similarity score data and for a third machine learning model, based on at least one antenna issue, as described above.

As further shown in FIG. 5, process 500 may include processing the sector-carrier pair data, with a third model, to identify one or more issues that span sector carriers of the base station (block 550). For example, the device may process the sector-carrier pair data, with the third machine learning model, to identify one or more issues that span sector carriers of the base station, as described above. In some implementations, the third machine learning model includes one or more hierarchical classification machine learning models.

As further shown in FIG. 5, process 500 may include calculating an issue status and alignment score based on the one or more issues and the same sector similarity score data (block 560). For example, the device may calculate an issue status and alignment score based on the one or more issues that span the sector carriers of the base station and based on the same sector similarity score data, as described above. In some implementations, calculating the issue status and alignment score includes calculating null space correlations associated with the base station, and determining, based on the null space correlations, whether the one or more issues are one or more of a bad line associated with the base station, poor antenna alignment associated with the base station, a single line swap associated with the base station, or a double line swap associated with the base station.

As further shown in FIG. 5, process 500 may include performing one or more actions based on the issue status and alignment score (block 570). For example, the device may perform one or more actions based on the issue status and alignment score, as described above. In some implementations, performing the one or more actions includes one or more of causing a technician to be dispatched to service an antenna of the base station, or causing an autonomous vehicle to be dispatched to service the antenna of the base station. In some implementations, performing the one or more actions includes identifying the base station associated with an antenna experiencing a problem based on the issue status and alignment score; determining one or more parameters, associated with the base station, to modify in order to correct the problem with the antenna; and instructing the base station to modify the one or more parameters in order to correct the problem with the antenna.

In some implementations, performing the one or more actions includes one or more of causing a repair to be scheduled for an antenna of the base station based on the issue status and alignment score, or causing a part to be ordered for the base station associated with the antenna based on the issue status and alignment score. In some implementations, performing the one or more actions includes determining a suggestion to modify one or more parameters for the base station associated with an antenna, based on the issue status and alignment score, and providing the suggestion for display.

In some implementations, process 500 includes generating a visualization for sector carriers at a branch level based on the one or more issues that span the sector carriers of the base station, and performing the one or more actions includes performing the one or more actions based on the visualization. In some implementations, the visualization includes a circle representing the base station, segments, on an outer edge of the circle, representing branches of the base station, and lines representing correlation values associated with the base station. In some implementations, the visualization indicates one or more of one or more bad lines associated with the base station, poor antenna alignment associated with the base station, a single line swap associated with the base station, or a double line swap associated with the base station.

In some implementations, process 500 includes ranking the same sector similarity score data prior to processing the same sector similarity score data with the second machine learning model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, uplink physical resource block (PRB) interference data from each radio port of a base station;
   processing, by the device, the uplink PRB interference data, with a first machine learning model, to generate same sector similarity score data for each radio port of the base station;
   processing, by the device, the same sector similarity score data, with a second machine learning model and at predefined intervals, to identify and classify at least one antenna issue associated with the base station;
   creating, by the device, sector-carrier pair data, from the same sector similarity score data and for a third machine learning model, based on the at least one antenna issue;
   processing, by the device, the sector-carrier pair data, with the third machine learning model, to identify one or more issues that span sector carriers of the base station;
   calculating, by the device, an issue status and alignment score based on the one or more issues that span the sector carriers of the base station and based on the same sector similarity score data; and
   performing, by the device, one or more actions based on the issue status and alignment score.

2. The method of claim 1, further comprising:
   generating a visualization for sector carriers at a branch level based on the one or more issues that span the sector carriers of the base station,
      wherein the one or more actions are performed based on the visualization.

3. The method of claim 2, wherein the visualization includes:
   a circle representing the base station,
   segments, on an outer edge of the circle, representing branches of the base station, and
   lines representing correlation values associated with the base station.

4. The method of claim 2, wherein the visualization indicates one or more of:
one or more bad lines associated with the base station,
poor antenna alignment associated with the base station,
a single line swap associated with the base station, or
a double line swap associated with the base station.

5. The method of claim 1, further comprising:
ranking the same sector similarity score data prior to processing the same sector similarity score data with the second machine learning model.

6. The method of claim 1, wherein each of the first machine learning model and the second machine learning model is a classification machine learning model.

7. The method of claim 1, wherein the third machine learning model includes one or more hierarchical classification machine learning models.

8. A device, comprising:
one or more processors configured to:
receive uplink physical resource block (PRB) interference data from each radio port of a base station;
process the uplink PRB interference data, with a first machine learning model, to generate same sector similarity score data for each radio port of the base station;
process the same sector similarity score data, with a second machine learning model and at predefined intervals, to identify and classify at least one antenna issue associated with the base station;
create sector-carrier pair data, from the same sector similarity score data and for a third machine learning model, based on the at least one antenna issue;
process the sector-carrier pair data, with the third machine learning model, to identify one or more issues that span sector carriers of the base station;
calculate an issue status and alignment score based on the one or more issues that span the sector carriers of the base station and based on the same sector similarity score data;
generate a visualization for sector carriers at a branch level based on the one or more issues that span the sector carriers of the base station; and
perform one or more actions based on the issue status and alignment score and/or the visualization.

9. The device of claim 8, wherein the one or more processors, to calculate the issue status and alignment score, are configured to:
calculate null space correlations associated with the base station; and
determine, based on the null space correlations, whether the one or more issues are one or more of:
a bad line associated with the base station,
poor antenna alignment associated with the base station,
a single line swap associated with the base station, or
a double line swap associated with the base station.

10. The device of claim 8, wherein the device is one of:
a cloud-computing device,
a server device,
the base station, or
a multi-access edge computing device.

11. The device of claim 8, wherein the one or more processors, to perform the one or more actions, are configured to one or more of:
cause a technician to be dispatched to service an antenna of the base station; or
cause an autonomous vehicle to be dispatched to service the antenna of the base station.

12. The device of claim 8, wherein the one or more processors, to perform the one or more actions, are configured to:
identify the base station associated with an antenna experiencing a problem based on the issue status and alignment score;
determine one or more parameters, associated with the base station, to modify in order to correct the problem with the antenna; and
instruct the base station to modify the one or more parameters in order to correct the problem with the antenna.

13. The device of claim 8, wherein the one or more processors, to perform the one or more actions, are configured to one or more of:
cause a repair to be scheduled for an antenna of the base station based on the issue status and alignment score; or
cause a part to be ordered for the base station associated with the antenna based on the issue status and alignment score.

14. The device of claim 8, wherein the one or more processors, to perform the one or more actions, are configured to:
determine a suggestion to modify one or more parameters for the base station associated with an antenna, based on the issue status and alignment score; and
provide the suggestion for display.

15. A non-transitory computer-readable medium storing a set of instructions, the set of instructions comprising:
one or more instructions that, when executed by one or more processors of a device, cause the device to:
receive uplink physical resource block (PRB) interference data from each radio port of a base station;
process the uplink PRB interference data, with a first machine learning model, to generate same sector similarity score data for each radio port of the base station;
rank the same sector similarity score data;
process the same sector similarity score data, with a second machine learning model and at predefined intervals, to identify and classify at least one antenna issue associated with the base station;
create sector-carrier pair data, from the same sector similarity score data and for a third machine learning model, based on the at least one antenna issue;
process the sector-carrier pair data, with the third machine learning model, to identify one or more issues that span sector carriers of the base station;
calculate an issue status and alignment score based on the one or more issues that span the sector carriers of the base station and based on the same sector similarity score data; and
perform one or more actions based on the issue status and alignment score.

16. The non-transitory computer-readable medium of claim 15, wherein the one or more instructions further cause the device to:
generate a visualization for sector carriers at a branch level based on the one or more issues that span the sector carriers of the base station,
wherein the one or more instructions, that cause the device to perform the one or more actions, cause the device to:
perform the one or more actions based on the visualization.

17. The non-transitory computer-readable medium of claim 15, wherein the one or more instructions, that cause the device to calculate the issue status and alignment score, cause the device to:
- calculate null space correlations associated with the base station; and
- determine, based on the null space correlations, whether the one or more issues are one or more of:
  - a bad line associated with the base station,
  - poor antenna alignment associated with the base station,
  - a single line swap associated with the base station, or
  - a double line swap associated with the base station.

18. The non-transitory computer-readable medium of claim 15, wherein the one or more instructions, that cause the device to perform the one or more actions, cause the device to one or more of:
- cause a technician to be dispatched to service a antenna of the base station;
- cause an autonomous vehicle to be dispatched to service the antenna of the base station;
- cause a repair to be scheduled for the antenna of the base station based on the issue status and alignment score; or
- cause a part to be ordered for the base station associated with the antenna based on the issue status and alignment score.

19. The non-transitory computer-readable medium of claim 15, wherein the one or more instructions, that cause the device to perform the one or more actions, cause the device to:
- identify the base station associated with an antenna experiencing a problem based on the issue status and alignment score;
- determine one or more parameters, associated with the base station, to modify in order to correct the problem with the antenna; and
- instruct the base station to modify the one or more parameters in order to correct the problem with the antenna.

20. The non-transitory computer-readable medium of claim 15, wherein the one or more instructions, that cause the device to perform the one or more actions, cause the device to:
- determine a suggestion to modify one or more parameters for the base station associated with an antenna, based on the issue status and alignment score; and
- provide the suggestion for display.

* * * * *